(12) United States Patent
Zhao et al.

(10) Patent No.: US 11,088,824 B2
(45) Date of Patent: Aug. 10, 2021

(54) METHOD AND APPARATUS FOR USE IN INFORMATION PROCESSING

(71) Applicant: Beijing Jingdong Qianshi Technology Co., Ltd., Beijing (CN)

(72) Inventors: Hongye Zhao, Beijing (CN); Yanchao Miao, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 157 days.

(21) Appl. No.: 16/488,905

(22) PCT Filed: Jan. 11, 2018

(86) PCT No.: PCT/CN2018/072282
§ 371 (c)(1),
(2) Date: Aug. 26, 2019

(87) PCT Pub. No.: WO2018/171302
PCT Pub. Date: Sep. 27, 2018

(65) Prior Publication Data
US 2020/0396055 A1    Dec. 17, 2020

(30) Foreign Application Priority Data
Mar. 20, 2017    (CN) .......................... 201710166663.4

(51) Int. Cl.
*H04L 9/06*    (2006.01)
*G06F 16/242*    (2019.01)
(Continued)

(52) U.S. Cl.
CPC .......... *H04L 9/0618* (2013.01); *G06F 16/243* (2019.01); *G06F 16/29* (2019.01);
(Continued)

(58) Field of Classification Search
CPC ... H04L 9/0618; H04L 9/0643; H04L 9/0863; H04L 9/0872; H04L 9/3239; H04L 63/00;
(Continued)

(56) References Cited

U.S. PATENT DOCUMENTS 7,120,254 B2 * 10/2006 Glick ...................... G06F 21/10
380/258
2007/0230374 A1 * 10/2007 Altberg ............... H04L 63/0428
370/271
(Continued)

FOREIGN PATENT DOCUMENTS

CN    1373459 A    10/2002
CN    104778509 A    7/2015
(Continued)

*Primary Examiner* — Cheng-Feng Huang
(74) *Attorney, Agent, or Firm* — Denise L. Mayfield; Dykema Gossett PLLC (57) ABSTRACT

Disclosed in the present invention are a method and apparatus for use in information processing. One embodiment of the method comprises acquiring address information and a telephone number of a user; converting the address information of the user into longitude and latitude data; encrypting the longitude and latitude data and the telephone number so as to produce a ciphertext; generating a bar code according to the ciphertext such that a terminal parses the address information and telephone number of the user by the bar code. Said embodiment may conceal personal information of the user so as to prevent the disclosure of the personal information of the user.

10 Claims, 5 Drawing Sheets

(51) Int. Cl.
*G06F 16/29* (2019.01)
*G06K 7/14* (2006.01)
*H04L 9/08* (2006.01)

(52) U.S. Cl.
CPC .......... *G06K 7/1408* (2013.01); *H04L 9/0643* (2013.01); *H04L 9/0863* (2013.01)

(58) Field of Classification Search
CPC ... H04L 63/0428; G06F 16/243; G06F 16/29; G06F 16/9554; G06K 7/1408; G06K 17/0025; G06K 19/06028; G06K 19/06037; H04W 12/00; G06Q 10/083
See application file for complete search history.

(56) References Cited

U.S. PATENT DOCUMENTS

| | | | |
|---|---|---|---|
| 2011/0212717 A1* | 9/2011 | Rhoads | G06F 16/58 455/420 |
| 2016/0337136 A1* | 11/2016 | Bester | H04W 12/10 |
| 2017/0236407 A1* | 8/2017 | Rhoads | G06F 16/29 455/420 |

FOREIGN PATENT DOCUMENTS

| CN | 104933539 A | 9/2015 |
|---|---|---|
| CN | 105072259 A | 11/2015 |
| CN | 105234087 A | 1/2016 |
| CN | 105321054 A | 2/2016 |
| CN | 105574692 A | 5/2016 |

* cited by examiner

METHOD AND APPARATUS FOR USE IN INFORMATION PROCESSING

CROSS-REFERENCE TO RELATED APPLICATIONS

This application is a national stage application filing of International Application No. PCT/CN2018/072282, filed on Jan. 11, 2018, which claims priority to Chinese Patent Application No. 201710166663.4 filed on Mar. 20, 2017, the contents of which are incorporated herein by reference in their entireties.

TECHNICAL FIELD

The present disclosure relates to the field of computer technology, specifically to the field of logistics technology, and more specifically to a method and apparatus for information processing.

BACKGROUND

In the field of logistics distribution, generally it is necessary to paste a delivery order on a parcel of a customer, such that a delivery personnel can deliver the parcel to the destination based on customer information on the delivery order. At present, the usual practice is to directly print practical information of the customer, such as address and contact information, on the delivery order, such that the delivery personnel acquires the customer information directly by naked eyes.

However, while the existing schemes have a good convenience, the practical information of the customer, such as the address and the contact information, is sensitive information, and the practical information recorded directly on the delivery order will be at risk of being revealed because of the circulation of the delivery order along with the parcel in public area. Therefore, it is necessary to improve the confidentiality of the delivery order, to protect the customer information security.

SUMMARY

An objective of the present disclosure is to provide an improved method and apparatus for information processing, to solve the technical problems mentioned in the above Background part.

In a first aspect, an embodiment of the present disclosure provides a method for information processing, including: acquiring address information and a telephone number of a user; converting the address information of the user into longitude and latitude data; encrypting the longitude and latitude data and the telephone number to generate a ciphertext; and generating a barcode based on the ciphertext, such that a terminal analyzes the address information and the telephone number of the user based on the barcode.

In some embodiments, the converting the address information of the user into longitude and latitude data includes: performing word segmentation on the address information of the user to obtain a keyword set; using a keyword matching address information of a preset longitude and latitude mapping table in the keyword set to constitute a first piece of address information, and using a keyword unmatching the address information of the preset longitude and latitude mapping table in the keyword set to constitute a second piece of address information, where the preset longitude and latitude mapping table stores the address information, longitude and latitude, and a corresponding relationship between the address information and the longitude and latitude; converting the first piece of address information into longitude and latitude information based on the preset longitude and latitude mapping table, and adding a preset offset to longitude data and latitude data in the longitude and latitude information; and generating the longitude and latitude data based on the longitude and latitude information added with the preset offset and the second piece of address information.

In some embodiments, the encrypting the longitude and latitude data and the telephone number to generate a ciphertext includes: encrypting the longitude and latitude data and the telephone number using a message digest algorithm (MD5), to generate the ciphertext.

In some embodiments, the generating a barcode based on the ciphertext includes: determining a format of a to-be-generated barcode based on a length of the ciphertext, and generating the barcode in accordance with the determined format, where the format includes any one of: a one-dimensional barcode, a two-dimensional barcode, or a three-dimensional barcode.

In some embodiments, the acquiring address information and a telephone number of a user includes: acquiring the address information and the telephone number of the user, and a name of the user; and the encrypting the longitude and latitude data and the telephone number to generate a ciphertext includes: encrypting the longitude and latitude data, the telephone number, and the name, to generate the ciphertext.

In a second aspect, an embodiment of the present disclosure provides a method for information processing, including: reading a to-be-identified barcode, and analyzing a ciphertext, the barcode being generated by a server by: converting address information of a user into longitude and latitude data, encrypting the longitude and latitude data and a telephone number of the user together to generate the ciphertext, and then generating the barcode based on the ciphertext; decrypting the ciphertext to obtain the longitude and latitude data and the telephone number; and analyzing the address information of the user from the longitude and latitude data.

In some embodiments, the analyzing the address information of the user from the longitude and latitude data includes: analyzing the longitude and latitude data into longitude and latitude information and a second piece of address information; subtracting a preset offset from longitude data and latitude data in the longitude and latitude information; converting the longitude and latitude information subtracted by the preset offset into a first piece of address information based on a preset longitude and latitude mapping table, where the preset longitude and latitude mapping table stores the address information, longitude and latitude, and a corresponding relationship between the address information and the longitude and latitude; and generating the address information of the user based on the first piece of address information and the second piece of address information.

In some embodiments, the ciphertext is generated based on the longitude and latitude data, the telephone number of the user, and the name of the user; and the method further includes: decrypting the ciphertext to obtain the name of the user.

In a third aspect, an embodiment of the present disclosure provides an apparatus for information processing, including: an acquiring unit configured to acquire address information and a telephone number of a user; a converting unit configured to convert the address information of the user into longitude and latitude data; an encrypting unit configured to encrypt the longitude and latitude data and the telephone number to generate a ciphertext; and a generating unit configured to generate a barcode based on the ciphertext, such that a terminal analyzes the address information and the telephone number of the user based on the barcode.

In some embodiments, the converting unit is further configured to: perform word segmentation on the address information of the user to obtain a keyword set; use a keyword matching address information of a preset longitude and latitude mapping table in the keyword set to constitute a first piece of address information, and use a keyword unmatching the address information of the preset longitude and latitude mapping table in the keyword set to constitute a second piece of address information, where the preset longitude and latitude mapping table stores the address information, longitude and latitude, and a corresponding relationship between the address information and the longitude and latitude; convert the first piece of address information into longitude and latitude information based on the preset longitude and latitude mapping table, and add a preset offset to longitude data and latitude data in the longitude and latitude information; and generate the longitude and latitude data based on the longitude and latitude information added with the preset offset and the second piece of address information.

In some embodiments, the encrypting unit is further configured to: encrypt the longitude and latitude data and the telephone number using a message digest algorithm (MD5), to generate the ciphertext.

In some embodiments, the generating unit is further configured to: determine a format of a to-be-generated barcode based on a length of the ciphertext, and generate the barcode in accordance with the determined format, where the format includes any one of: a one-dimensional barcode, a two-dimensional barcode, or a three-dimensional barcode.

In some embodiments, the acquiring unit is further configured to: acquire the address information and the telephone number of the user, and a name of the user; and the encrypting unit is further configured to: encrypt the longitude and latitude data, the telephone number, and the name, to generate the ciphertext.

In a fourth aspect, an embodiment of the present disclosure provides an apparatus for information processing, including: a reading unit configured to read a to-be-identified barcode, and analyze a ciphertext, the barcode being generated by a server by: converting address information of a user into longitude and latitude data, encrypting the longitude and latitude data and a telephone number of the user together to generate the ciphertext, and then generating the barcode based on the ciphertext; a decrypting unit configured to decrypt the ciphertext to obtain the longitude and latitude data and the telephone number; and an analyzing unit configured to analyze the address information of the user from the longitude and latitude data.

In some embodiments, the analyzing unit is further configured to: analyze the longitude and latitude data into longitude and latitude information and a second piece of address information; subtract a preset offset from longitude data and latitude data in the longitude and latitude information; convert the longitude and latitude information subtracted by the preset offset into a first piece of address information based on a preset longitude and latitude mapping table, where the preset longitude and latitude mapping table stores the address information, longitude and latitude, and a corresponding relationship between the address information and the longitude and latitude; and generate the address information of the user based on the first piece of address information and the second piece of address information.

In some embodiments, the ciphertext is generated based on the longitude and latitude data, the telephone number of the user, and the name of the user; and the decrypting unit is further configured to: decrypt the ciphertext to obtain the name of the user.

In a fifth aspect, an embodiment of the present disclosure provides a device, including: one or more processors; and a storage apparatus configured to store one or more programs, where the one or more programs, when executed by the one or more processors, cause the one or more processors to implement the method according to any one embodiment in the first aspect and the second aspect.

In a sixth aspect, an embodiment of the present disclosure provides a computer readable storage medium, storing a computer program thereon, where the program, when executed by a processor, implements the method according to any one embodiment in the first aspect and the second aspect.

The method and apparatus for information processing provided by the embodiments of the present disclosure convert address information of a user into longitude and latitude data, encrypt the converted longitude and latitude data and a telephone number of the user together into a ciphertext, and then generate a barcode based on the ciphertext, thus hiding the address information and the telephone number of the user, and avoiding revealing the address information and the telephone number of the user. A user using the address information and the telephone number of the user can recover the hidden address information and the hidden telephone number from the barcode through a reverse process of the above process. This method improves the personal information security of the user, whilst maintaining the portability during the logistics distribution.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
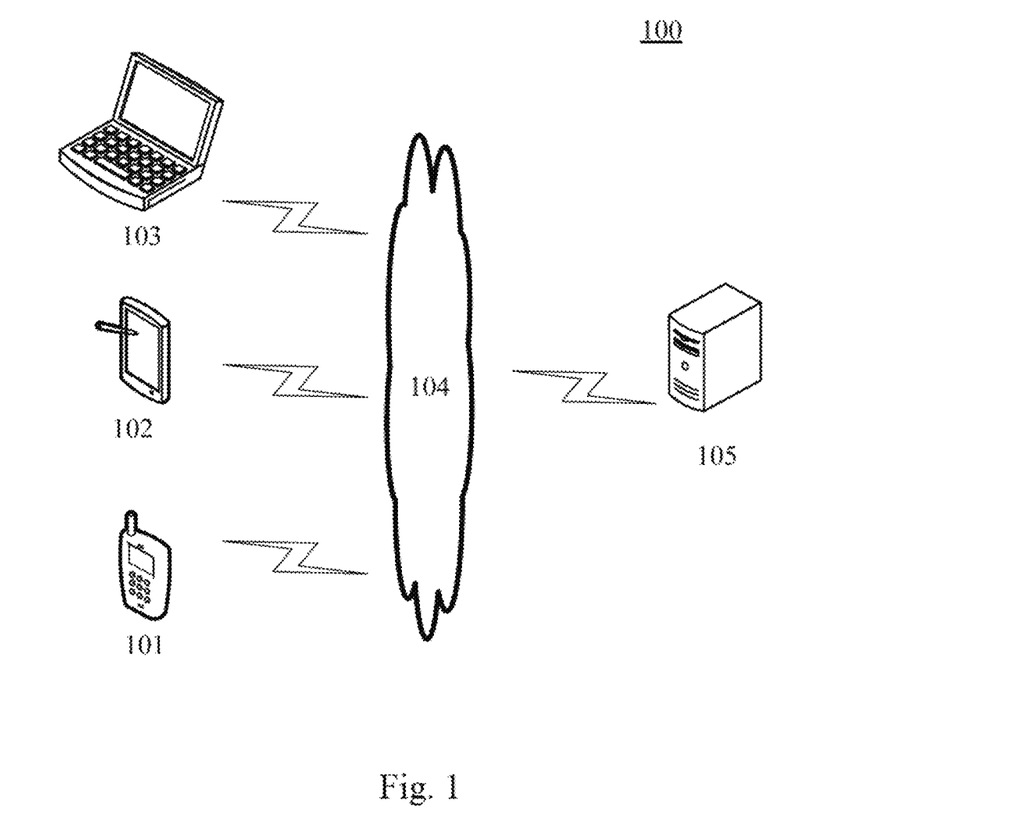
FIG. 1 is a diagram of an exemplary system architecture in which the present disclosure may be implemented.

FIG. 1 shows an exemplary system architecture 100 in which an embodiment of a method for information processing or an apparatus for information processing of the present disclosure may be implemented.

As shown in FIG. 1, the system architecture 100 may include terminal devices 101, 102, and 103, a network 104, and a server 105. The network 104 serves as a medium providing a communication link between the terminal devices 101, 102, and 103, and the server 105. The network 104 may include various types of connections, such as wired or wireless communication links, or optical fibers.

A user may interact with the server 105 using the terminal devices 101, 102, and 103 via the network 104, for example, to receive or send a message. The terminal devices 101, 102 and 103 may be provided with various code scanning client applications, such as a payment tool application, a shopping application, a search application, an instant messaging tool, an mailbox client, and social platform software.

The terminal devices 101, 102, and 103 may be various electronic devices having a display screen and supporting a code scanning function, including but not limited to a smart phone, a tablet computer, an e-book reader, an MP3 (Moving Picture Experts Group Audio Layer III) player, an MP4 (Moving Picture Experts Group Audio Layer IV) player, a laptop portable computer, a desktop computer, or the like.

The server 105 may be a server providing various services, such as a backend barcode server providing support for barcodes displayed on the terminal devices 101, 102, and 103. A backend web server can process, e.g., analyze, data, such as received address information and a received telephone number of the user, and return the processing results (e.g., the barcodes) to the terminal devices. The backend web server can further process, e.g., analyze, the received barcodes scanned by the user via the terminal devices, and return the processing results (e.g., the address information and the telephone number of the user) to the terminal devices.

It should be noted that the method for information processing provided by the embodiment of the present disclosure is generally executed by the server 105. Accordingly, the apparatus for information processing is generally provided in the server 105.

It should be understood that the numbers of terminals, networks, and servers in FIG. 1 are merely illustrative. Any number of terminal devices, networks, and servers may be provided based on actual requirements.

Figure 2:
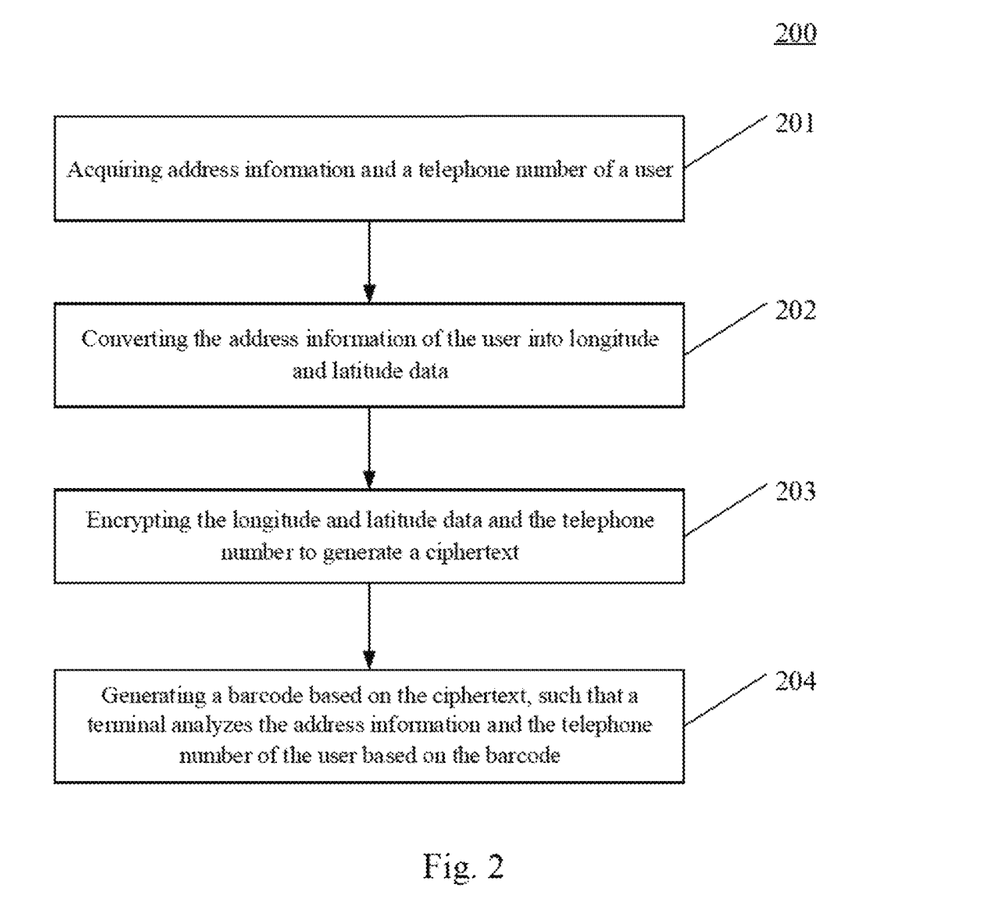
FIG. 2 is a flowchart of an embodiment of a method for information processing according to the present disclosure.

Further referring to FIG. 2, a process 200 of an embodiment of a method for information processing according to the present disclosure is shown. The method for information processing includes the following steps.

Step 201: acquiring address information and a telephone number of a user.

In the present embodiment, an electronic device (e.g., the server as shown in FIG. 1) on which the method for information processing is performed can receive, through a wired or wireless connection, address information and a telephone number of a consignee and/or a consignor from a terminal through which the user performs information input. The user can further input the address information and the telephone number of the consignee and/or the consignor directly via a keyboard of the electronic device.

In some alternative implementations of the present embodiment, the electronic device can receive not only the address information and the telephone number of the consignee and/or the consignor, but also a name of the consignee and/or the consignor. The name may be a full name or an abbreviated name, such as Ms. Wang, or Mr. Li.

Step 202: converting the address information of the user into longitude and latitude data.

In the present embodiment, since the address information of the user is a practical geographic address, the address information of the user can be converted into the longitude and latitude data based on a geographic information system (GIS). For example, Beige Road, Changping District, Beijing City, China is converted into a longitude 116.091426 and a latitude 50.16966.

In some alternative implementations of the present embodiment, the converting the address information of the user into longitude and latitude data includes: performing word segmentation on the address information of the user to obtain a keyword set; using a keyword matching address information of a preset longitude and latitude mapping table in the keyword set to constitute a first piece of address information, and using a keyword unmatching the address information of the preset longitude and latitude mapping table in the keyword set to constitute a second piece of address information, where the preset longitude and latitude mapping table stores the address information, longitude and latitude, and a corresponding relationship between the address information and the longitude and latitude; converting the first piece of address information into longitude and latitude information based on the preset longitude and latitude mapping table, and adding a preset offset to longitude data and latitude data in the longitude and latitude information; and generating the longitude and latitude data based on the longitude and latitude information added with the preset offset and the second piece of address information. Since the longitude and latitude converting system can only be located to a building, it is difficult to be accurate to a specific house number. Therefore, it is necessary to divide original address information of the user into two parts: the first piece of address information (i.e., address information based on which the longitude and latitude can be determined directly) and the second piece of address information (i.e., information, such as the house number, that cannot be determined by the longitude and latitude). Word segmentation of the address information of the user is performed to obtain the keyword set. Word segmentation of the address information of the user can be performed based on the geographic information system to obtain a maximum matching keyword as the first piece of address information, and information unmatching the geographic information system can be used as the second piece of address information. As shown in the table below, information matching the geographic information system is used as the first piece of address information, and the house number is used as the second piece of address information. After the preset offset is added to the longitude data and the latitude data, it is very difficult for other users to obtain information of the user in the case that the other users do not know encryption and offset approaches.

TABLE 1

| Original address information | First piece of address information | Longitude and latitude information | Second piece of address information |
| --- | --- | --- | --- |
| House No. 705, Building 3, Hongye Xingyuan II, Fengtai District, Beijing City, China | Building 3, Hongye Xingyuan II, Fengtai District, Beijing City, China | 116.31111, 39.84583 | 705 |
| House No. 1802, Building 2, Beige Road, Changping District, Beijing City, China | Building 2, Beige Road, Changping District, Beijing City, China | 116.091426, 50.16966 | 1802 |

Step 203: encrypting the longitude and latitude data and the telephone number to generate a ciphertext.

In the present embodiment, the longitude and latitude data and the telephone number obtained in step 202 are encrypted using a conventional encryption algorithm, to generate a ciphertext. A format of the longitude and latitude data and the telephone number can be predefined. For example, a length of the longitude and latitude is defined to be a fixed value, and a length of a total length minus the fixed value is a length of the telephone number. A basic process of data encryption is to process a file that was originally a plaintext or data in accordance with an algorithm, such that the file or data become an unreadable code segment, which is often referred to as a "ciphertext", and can show original content only after inputting the corresponding key, thereby achieving the purpose of protecting the data from being stolen or read by an unauthorized person by such an approach. A reverse process of this process is decryption, i.e., a process of converting the code information into its original data. A key used by the server for encryption may be pre-agreed with the terminal, or be dynamically acquired by an authorized terminal from the server.

In some alternative implementations of the present embodiment, the longitude and latitude data and the telephone number are encrypted using message digest algorithm (MD5), to generate the ciphertext. The MD5 is a hash function that is widely used in the field of computer security to provide message integrity protection.

Step 204: generating a barcode based on the ciphertext, such that a terminal analyzes the address information and the telephone number of the user based on the barcode.

In the present embodiment, the barcode is generated based on the ciphertext obtained in step 203. The barcode is a graphical identifier of a plurality of black bars and blanks of varying widths arranged in accordance with certain coding rules to express a set of information. A common barcode is a pattern of parallel lines of arranged black bars (abbreviated as bars) and white bars (abbreviated as blanks) with greatly different reflectivity. The barcode may be a multi-dimensional barcode, such as a one-dimensional barcode, a two-dimensional barcode, or a three-dimensional barcode. The one-dimensional barcode expresses information in merely one direction (generally a horizontal direction), expresses not any information in a vertical direction, and is generally designed to have a certain height to facilitate alignment with a reader. The two-dimensional barcode is a barcode storing information in a two-dimensional space of the horizontal direction and the vertical direction. The three-dimensional barcode is also known as the multi-dimensional barcode or world-wide barcode, and can represent all information in a computer relative to the two-dimensional barcode. After the server prints a generated barcode, the user pastes the barcode to an outer packing of a parcel. A delivery personnel can scan the barcode using a terminal having a code scanning function, to obtain information, such as an address and the telephone number of the consignee. However, other people without an identification permission cannot obtain the information, such as the address and the telephone number of the consignee, from the barcode. Therefore, the scheme of the present application can protect the personal information security.

In some alternative implementations of the present embodiment, a format of a to-be-generated barcode is determined based on a length of the ciphertext, and the barcode is generated in accordance with the determined format, where the format includes any one of: the one-dimensional barcode, the two-dimensional barcode, or the three-dimensional barcode. The length of the ciphertext generated using a different encryption algorithm is also different, and the format of the barcode is selected for different lengths. For example, the one-dimensional barcode may be selected for a ciphertext having a length less than a preset length. Only the two-dimensional barcode or the three-dimensional barcode can be selected for a ciphertext having a length greater than or equal to the preset length. Even though the two-dimensional barcode is damaged or incomplete, reading information of the two-dimensional barcode will not be affected, which cannot apply to the three-dimensional barcode due to poor fault tolerance. Even if one pixel of the three-dimensional barcode is destroyed, or carries a color difference, all data will be lost, and cannot be read. Therefore, when the three-dimensional barcode is selected, a distance between a consignee's address and a consignor's address needs to be pre-measured to estimate a number of transited logistics sites. When the number of to-be-transited logistics sites is greater than a certain number threshold, the two-dimensional barcode is used.

The method provided by the above embodiments of the present disclosure converts address information of a user into coordinate data, and encrypts the converted coordinate data and a telephone number of the user together, thereby enhancing the user information security. Further, Chinese characters are converted into longitude and latitude and then encrypted, which is less difficult than directly encoding the Chinese characters and then encrypting the encoded Chinese characters, and reduces a ciphertext length, thereby reducing the complexity in generating a barcode.

Figure 3:
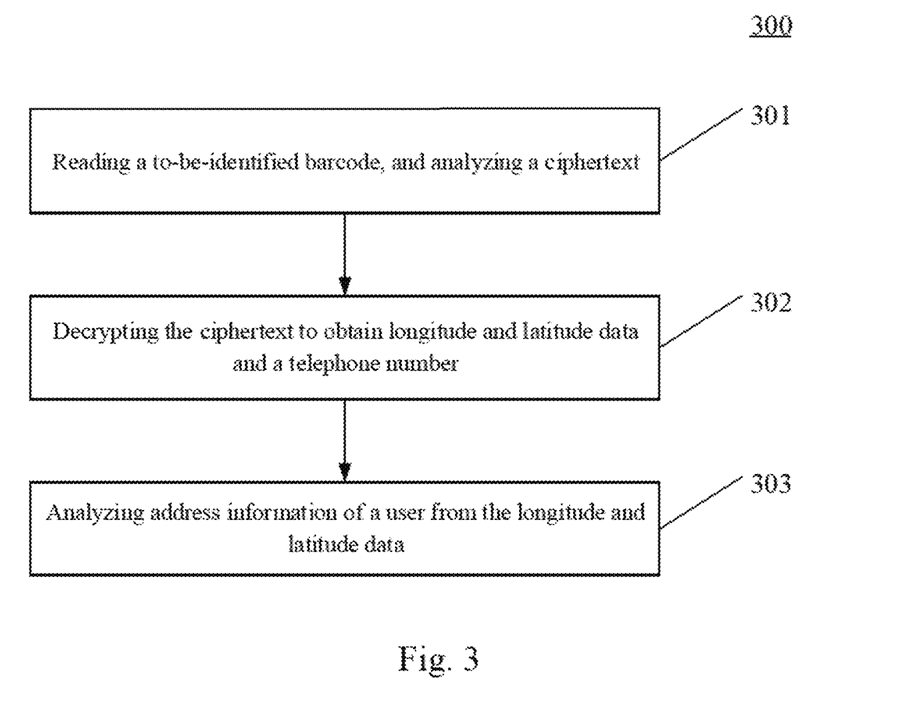
FIG. 3 is a flowchart of another embodiment of the method for information processing according to the present disclosure.

Further referring to FIG. 3, a process 300 of another embodiment of the method for information processing is shown. The process 300 of the method for information processing includes the following steps.

Step 301: reading a to-be-identified barcode, and analyzing a ciphertext.

In the present embodiment, an electronic device (e.g., the terminal shown in FIG. 1) on which the method for information processing is performed can scan the to-be-identified barcode to read the to-be-identified barcode, and analyze the ciphertext. The barcode is generated by a server through: converting address information of a user into longitude and latitude data, encrypting the longitude and latitude data and a telephone number of the user together to generate the ciphertext, and then generating the barcode based on the ciphertext. The terminal needs to have a code scanning function, and may be a special purpose terminal supporting the server, or an ordinary smart phone. When the user needs to scan the barcode, the user can scan the code by opening scanning software, to acquire information. The acquired information is not a plaintext, but the encrypted longitude and latitude data and telephone number.

Step 302: decrypting the ciphertext to obtain longitude and latitude data and a telephone number.

In the present embodiment, the electronic device can pre-acquire a dynamic key for decryption from the server, or perform decryption in accordance with a pre-agreed key. Only by having a decryption permission, can the terminal obtain the key. A decrypted ciphertext is split into the longitude and latitude data and the telephone number in accordance with a pre-agreed format.

Step 303: analyzing address information of a user from the longitude and latitude data.

In the present embodiment, the longitude and latitude data are converted into the address information that can be directly identified by the user by naked eyes based on a preset longitude and latitude mapping table. For example, a longitude 116.091426 and a latitude 50.16966 are converted into Beige Road, Changping District, Beijing City, China.

In some alternative implementations of the present embodiment, the analyzing the address information of the user from the longitude and latitude data includes: analyzing the longitude and latitude data into longitude and latitude information and a second piece of address information; subtracting a preset offset from longitude data and latitude data in the longitude and latitude information; converting the longitude and latitude information subtracted by the preset offset into a first piece of address information based on a preset longitude and latitude mapping table, where the preset longitude and latitude mapping table stores the address information, longitude and latitude, and a corresponding relationship between the address information and the longitude and latitude; and generating the address information of the user based on the first piece of address information and the second piece of address information. This process is an inverse process of step 202. Only by pre-knowing an offset approach used by a server side, can the longitude data and the latitude data be correctly parsed out, and then can the longitude data and the latitude data be converted into an accurate first piece of address information. Then, complete address information can be obtained with the addition of the second piece of address information.

In some alternative implementations of the present embodiment, if the server further encrypts a name of the user, then the terminal needs to decrypt the name of the user. In addition, the terminal further includes a telephone dialing function, and although the telephone number is parsed out, the telephone number is displayed by hiding some information. A delivery personnel cannot see the telephone number of a consignee, but can call the consignee by directly invoking the telephone dialing function, thereby avoiding dialing the telephone number of the consignee by the delivery personnel through manually inputting the telephone number of the consignee, improving the work efficiency and accuracy, facilitating tracking work of the delivery personnel by binding the telephone dialing function to the approach of the present disclosure, and effectively managing the work of the delivery personnel.

As can be seen from FIG. 3, compared with the corresponding embodiment of FIG. 2, the process 300 of the method for information processing in the present embodiment highlights the analyzing information. Coordinated use of the server and the terminal can ensure the user information security, avoid revealing personal information of the user in the delivery process, improve the work efficiency of the delivery personnel, and save the time costs and management costs.

Figure 4:
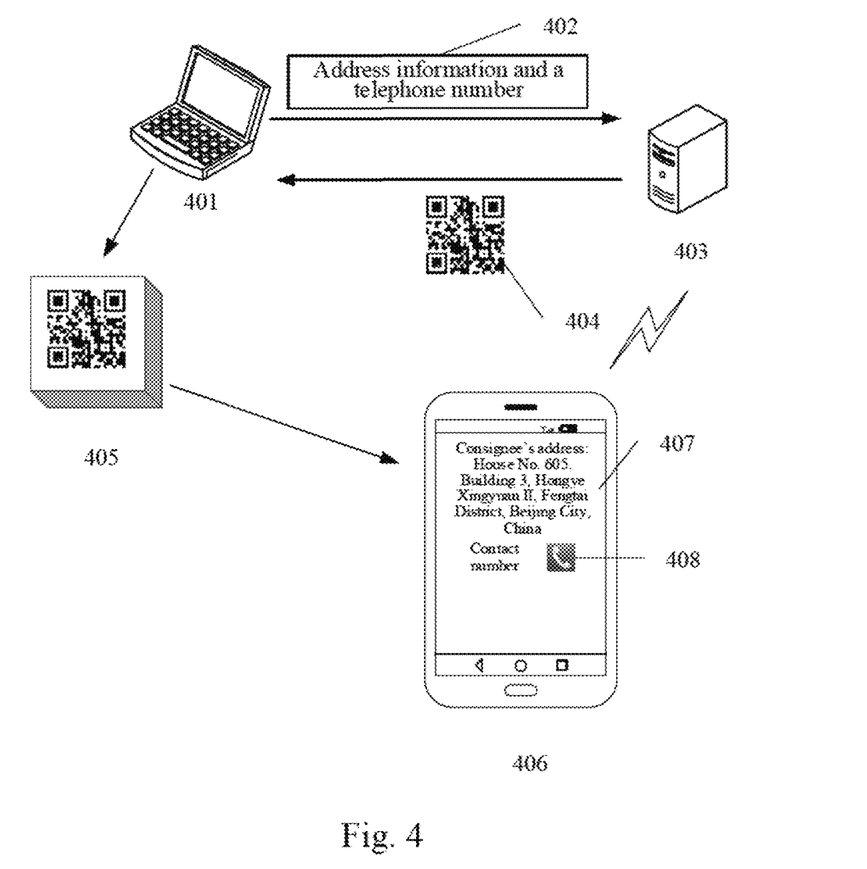
FIG. 4 is a schematic diagram of an application scenario of the method for information processing according to the present disclosure.

Further referring to FIG. 4, FIG. 4 is a schematic diagram of an application scenario of the method for information processing according to the present embodiment. In the application scenario of FIG. 4, a user sends address information and a telephone number 402 of a consignee to a server 403 via a terminal 401. The server 403 converts the address information into longitude and latitude, encrypts the converted longitude and latitude and the telephone number together to generate a barcode 404, and returns the barcode to the terminal 401. Then, the user prints the barcode 404 received by the terminal 401, and pastes the barcode to a parcel 405. A delivery personnel reads a to-be-identified barcode by scanning the barcode on the parcel 405 via a delivery terminal 406, analyzes a ciphertext, and analyzes the address information of the user from longitude and latitude data. Then, the delivery terminal 406 shows an address 407 and a hidden telephone number 408 of the consignee (the analyzing process may also be implemented by the server 403, i.e., sending scanned barcode data to the server 403, the server 403 returning the analyzing result to the delivery terminal 406). The delivery personnel cannot see the telephone number, but can call the consignee by directly clicking the hidden telephone number 408.

The method provided by the above embodiments of the present disclosure converts address information of a user into longitude and latitude, and encrypts the converted longitude and latitude and a telephone number of the user together, thereby protecting personal information of the user, and improving the delivery efficiency.

Figure 5:
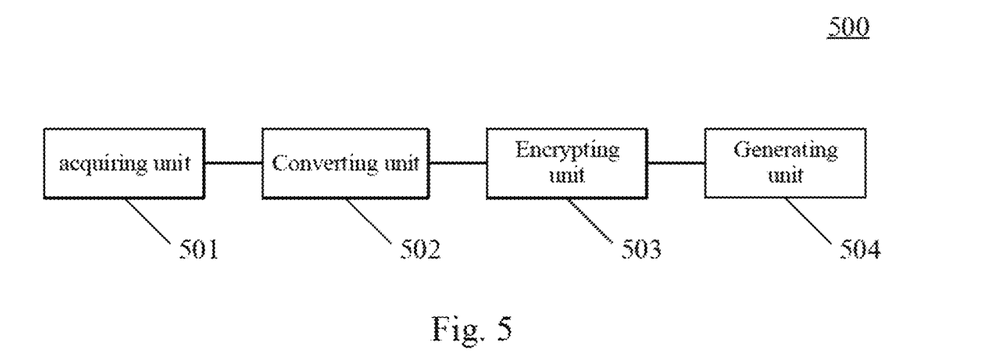
FIG. 5 is a schematic structural diagram of an embodiment of an apparatus for information processing according to the present disclosure.

Further referring to FIG. 5, as an implementation of the method shown in the above figures, the present disclosure provides an embodiment of an apparatus for information processing. The embodiment of the apparatus corresponds to the embodiment of the method shown in FIG. 2. The apparatus may be specifically applied to various electronic devices.

As shown in FIG. 5, the apparatus 500 for information processing of the present embodiment includes: an acquiring unit 501, a converting unit 502, an encrypting unit 503, and a generating unit 504. The acquiring unit 501 is configured to acquire address information and a telephone number of a user; the converting unit 502 is configured to convert the address information of the user into longitude and latitude data; the encrypting unit 503 is configured to encrypt the longitude and latitude data and the telephone number to generate a ciphertext; and the generating unit 504 is configured to generate a barcode based on the ciphertext, such that a terminal analyzes the address information and the telephone number of the user based on the barcode.

In the present embodiment, specific processing of the acquiring unit 501, the converting unit 502, the encrypting unit 503, and the generating unit 504 of the apparatus 500 for information processing may be referred to step 201, step 202, step 203, and step 204 in the corresponding embodiment of FIG. 2.

In some alternative implementations of the present embodiment, the converting unit 502 is further configured to: perform word segmentation on the address information of the user to obtain a keyword set; use a keyword matching address information of a preset longitude and latitude mapping table in the keyword set to constitute a first piece of address information, and use a keyword unmatching the address information of the preset longitude and latitude mapping table in the keyword set to constitute a second piece of address information, where the preset longitude and latitude mapping table stores the address information, longitude and latitude, and a corresponding relationship between the address information and the longitude and latitude; convert the first piece of address information into longitude and latitude information based on the preset longitude and latitude mapping table, and add a preset offset to longitude data and latitude data in the longitude and latitude information; and generate the longitude and latitude data based on the longitude and latitude information added with the preset offset and the second piece of address information.

In some alternative implementations of the present embodiment, the encrypting unit 503 is further configured to: encrypt the longitude and latitude data and the telephone number using a message digest algorithm (MD5), to generate the ciphertext.

In some alternative implementations of the present embodiment, the generating unit 504 is further configured to: determine a format of a to-be-generated barcode based on a length of the ciphertext, and generate the barcode in accordance with the determined format, where the format includes any one of: a one-dimensional barcode, a two-dimensional barcode, or a three-dimensional barcode.

In some alternative implementations of the present embodiment, the acquiring unit 501 is further configured to: acquire the address information and the telephone number of the user, and a name of the user; and the encrypting unit 503 is further configured to: encrypt the longitude and latitude data, the telephone number, and the name, to generate the ciphertext.

Figure 6:
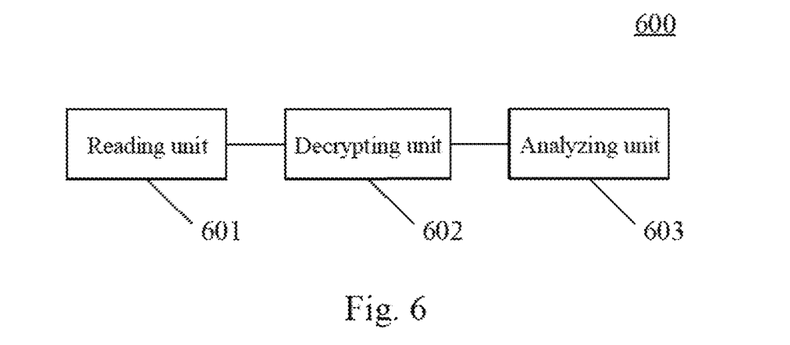
FIG. 6 is a schematic structural diagram of another embodiment of the apparatus for information processing according to the present disclosure.

Further referring to FIG. 6, as an implementation of the method shown in the above figures, the present disclosure provides an embodiment of an apparatus for information processing. The embodiment of the apparatus corresponds to the embodiment of the method shown in FIG. 3. The apparatus may be specifically applied to various electronic devices.

As shown in FIG. 6, the apparatus 600 for information processing of the present embodiment includes: a reading unit 601, a decrypting unit 602, and an analyzing unit 603. The reading unit 601 is configured to read a to-be-identified barcode, and analyze a ciphertext, the barcode is generated by a server by: converting address information of a user into longitude and latitude data, encrypting the longitude and latitude data and a telephone number of the user together to generate the ciphertext, and then generating the barcode based on the ciphertext; the decrypting unit 602 is configured to decrypt the ciphertext to obtain the longitude and latitude data and the telephone number; and the analyzing unit 603 is configured to analyze the address information of the user from the longitude and latitude data.

In the present embodiment, specific processing of the reading unit 601, the decrypting unit 602, and the analyzing unit 603 of the apparatus 600 for information processing may be referred to step 301, step 302, and step 303 in the corresponding embodiment of FIG. 3.

In some alternative implementations of the present embodiment, the analyzing unit 603 is further configured to: analyze the longitude and latitude data into longitude and latitude information and a second piece of address information; subtract a preset offset from longitude data and latitude data in the longitude and latitude information; convert the longitude and latitude information subtracted by the preset offset into a first piece of address information based on a preset longitude and latitude mapping table, where the preset longitude and latitude mapping table stores the address information, longitude and latitude, and a corresponding relationship between the address information and the longitude and latitude; and generate the address information of the user based on the first piece of address information and the second piece of address information.

In some alternative implementations of the present embodiment, the cipher text is generated based on the longitude and latitude data, the telephone number of the user, and the name of the user; and the decrypting unit 602 is further configured to: decrypt the ciphertext to obtain the name of the user.

Figure 7:
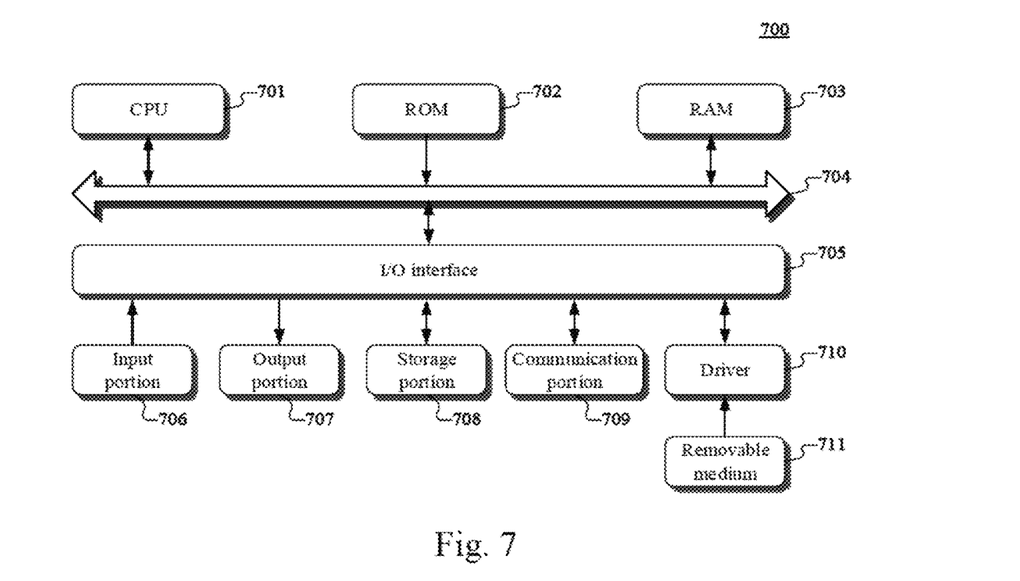
FIG. 7 is a schematic structural diagram of a computer system adapted to implement a terminal device or a server of embodiments of the present disclosure.

Referring to FIG. 7 below, a schematic structural diagram of a computer system 700 adapted to implement a terminal device/server of embodiments of the present disclosure is shown. The terminal device/server shown in FIG. 7 is merely an example, and should not limit the functions and scope of use of the embodiments of the present disclosure.

As shown in FIG. 7, the computer system 700 includes a central processing unit (CPU) 701, which may execute various appropriate actions and processes in accordance with a program stored in a read only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse, a barcode scanner, or the like; an output portion 707 including a cathode ray tube (CRT), a liquid crystal display device (LCD), a printer, a speaker, or the like; a storage portion 708 including a hard disk, or the like; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, such that a computer program read therefrom is installed on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a computer readable medium. The computer program includes program codes for executing the method as illustrated in the flow chart. In such an embodiment, the computer program may be downloaded and installed from a network via the communication portion 709, and/or may be installed from the removable medium 711. The computer program, when executed by the central processing unit (CPU) 701, implements the above functions as defined by the method of the present disclosure. It should be noted that the computer readable medium according to the present disclosure may be a computer readable signal medium or a computer readable storage medium or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In the present disclosure, the computer readable storage medium may be any tangible medium containing or storing programs, which may be used by a command execution system, apparatus or element, or incorporated thereto. In the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a module, a program segment, or a code portion, said module, program segment, or code portion comprising one or more executable instructions for implementing specified logical functions. It should also be noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor, for example, described as: a processor, including an acquiring unit, a converting unit, an encrypting unit, and a generating unit. The names of the units do not constitute a limitation to such units themselves in some cases. For example, the acquiring unit may be further described as "a unit for acquiring address information and a telephone number of a user."

In another aspect, the present disclosure further provides a computer readable medium. The computer readable medium may be included in the apparatus in the above described embodiments, or a stand-alone computer readable medium without being assembled into the apparatus. The computer readable medium stores one or more programs. The one or more programs, when executed by the apparatus, cause the apparatus to: acquire address information and a telephone number of a user; convert the address information of the user into longitude and latitude data; encrypt the longitude and latitude data and the telephone number to generate a ciphertext; and generate a barcode based on the ciphertext, such that a terminal analyzes the address information and the telephone number of the user based on the barcode. Alternatively, the one or more programs, when executed by the apparatus, cause the apparatus to: read a to-be-identified barcode, and analyze a ciphertext, the barcode generated by a server through: converting address information of a user into longitude and latitude data, encrypting the longitude and latitude data and the telephone number of the user together to generate the ciphertext, and then generating the barcode based on the ciphertext; decrypt the ciphertext to obtain the longitude and latitude data and the telephone number; and analyze the address information of the user from the longitude and latitude data.

The above description only provides explanation of the preferred embodiments of the present disclosure and the employed technical principles. It should be appreciated by those skilled in the art that the inventive scope of the present disclosure is not limited to the technical solutions formed by the particular combinations of the above-described technical features. The inventive scope should also cover other technical solutions formed by any combination of the above-described technical features or equivalent features thereof without departing from the concept of the disclosure, for example, technical solutions formed by the above-described features being interchanged with, but not limited to, technical features with similar functions disclosed in the present disclosure.

What is claimed is:

1. A method for information processing, comprising:
acquiring address information and a telephone number of a user;
converting the address information of the user into longitude and latitude data;
encrypting the longitude and latitude data and the telephone number to generate a ciphertext; and
generating a barcode based on the ciphertext, such that a terminal analyzes the address information and the telephone number of the user based on the barcode,
wherein converting the address information of the user into longitude and latitude data comprises:
performing word segmentation on the address information of the user to obtain a keyword set;
using a keyword matching address information of a preset longitude and latitude mapping table in the keyword set to constitute a first piece of address information, and using a keyword unmatching the address information of the preset longitude and latitude mapping table in the keyword set to constitute a second piece of address information, wherein the longitude and latitude mapping table stores the address information, longitude and latitude, and a corresponding relationship between the address information and the longitude and latitude;
converting the first piece of address information into longitude and latitude information based on the longitude and latitude mapping table, and adding a preset offset to longitude data and latitude data in the longitude and latitude information; and
generating the longitude and latitude data based on the longitude and latitude information added with the preset offset and the second piece of address information; and
wherein acquiring address information and a telephone number of a user comprises:
acquiring the address information and the telephone number of the user, and a name of the user; and
the encrypting the longitude and latitude data and the telephone number to generate a ciphertext comprises encrypting the longitude and latitude data, the telephone number, and the name, to generate the ciphertext.

2. The method according to claim 1, wherein the encrypting the longitude and latitude data and the telephone number to generate a ciphertext comprises:
    encrypting the longitude and latitude data and the telephone number using a message digest algorithm (MD5), to generate the ciphertext.

3. The method according to claim 1, wherein the generating a barcode based on the ciphertext comprises:
    determining a format of a to-be-generated barcode based on a length of the ciphertext, and generating the barcode in accordance with the determined format, wherein the format comprises any one of: a one-dimensional barcode, a two-dimensional barcode, or a three-dimensional barcode.

4. A method for information processing, comprising:
    reading a to-be-identified barcode, and analyzing a ciphertext, the barcode being generated by a server by: converting address information of a user into longitude and latitude data, encrypting the longitude and latitude data and a telephone number of the user together to generate the ciphertext, and then generating the barcode based on the ciphertext;
    decrypting the ciphertext to obtain the longitude and latitude data and the telephone number;
    analyzing the address information of the user from the longitude and latitude data,
wherein the analyzing the address information of the user from the longitude and latitude data comprises:
    analyzing the longitude and latitude data into longitude and latitude information and a second piece of address information;
    subtracting a preset offset from longitude data and latitude data in the longitude and latitude information;
    converting the longitude and latitude information subtracted by the preset offset into a first piece of address information based on a preset longitude and latitude mapping table, wherein the longitude and latitude mapping table stores the address information, longitude and latitude, and a corresponding relationship between the address information and the longitude and latitude; and
    generating the address information of the user based on the first piece of address information and the second piece of address information;
wherein the ciphertext is generated based on the longitude and latitude data, the telephone number of the user, and the name of the user; and
    the operations further comprise:
    decrypting the ciphertext to obtain the name of the user.

5. An apparatus for information processing, comprising:
    at least one hardware processor;
    memory storing instructions, the instructions when executed by the at least one hardware processor, cause the at least one hardware processor to perform operations, the operations comprising:
    acquiring address information and a telephone number of a user;
    converting the address information of the user into longitude and latitude data;
    encrypting the longitude and latitude data and the telephone number to generate a ciphertext; and
    generating a barcode based on the ciphertext, such that a terminal analyzes the address information and the telephone number of the user based on the barcode,
wherein the converting the address information of the user into longitude and latitude data comprises:
    performing word segmentation on the address information of the user to obtain a keyword set;
    using a keyword matching address information of a preset longitude and latitude mapping table in the keyword set to constitute a first piece of address information, and using a keyword unmatching the address information of the preset longitude and latitude mapping table in the keyword set to constitute a second piece of address information, wherein the preset longitude and latitude mapping table stores the address information, longitude and latitude, and a corresponding relationship between the address information and the longitude and latitude;
    converting the first piece of address information into longitude and latitude information based on the preset longitude and latitude mapping table, and adding a preset offset to longitude data and latitude data in the longitude and latitude information; and
    generating the longitude and latitude data based on the longitude and latitude information added with the preset offset and the second piece of address information, and
wherein the acquiring address information and a telephone number of a user comprises:
    acquiring the address information and the telephone number of the user, and a name of the user; and
    the encrypting the longitude and latitude data and the telephone number to generate a ciphertext comprises:
    encrypting the longitude and latitude data, the telephone number, and the name, to generate the ciphertext.

6. The apparatus according to claim 5, wherein the encrypting, the longitude and latitude data and the telephone number to generate a ciphertext comprises:
    encrypting the longitude and latitude data and the telephone number using a message digest algorithm (MD5), to generate the ciphertext.

7. The apparatus according to claim 5, wherein the generating a barcode based on the ciphertext comprises:
    determining a format of a to-be-generated barcode based on a length of the ciphertext, and generating the barcode in accordance with the determined format, wherein the format comprises any one of: a one-dimensional barcode, a two-dimensional barcode, or a three-dimensional barcode.

8. An apparatus for information processing, comprising:
    at least one hardware processor; and
    a memory storing instructions, the instructions when executed by the at least one hardware processor, cause the at least one hardware processor to perform operations, the operations comprising:
    reading a to-be-identified barcode, and analyzing a ciphertext, the barcode being generated by a server by: converting address information of a user into longitude and latitude data, encrypting the longitude and latitude data and a telephone number of the user together to generate the ciphertext, and then generating the barcode based on the ciphertext;
    decrypting the ciphertext to obtain the longitude and latitude data and the telephone number; and
    analyzing the address information of the user from the longitude and latitude data,
wherein the analyzing the address information of the user from the longitude and latitude data comprises:

analyze analyzing the longitude and latitude data into longitude and latitude information and a second piece of address information;
subtracting a preset offset from longitude data and latitude data in the longitude and latitude information;
converting the longitude and latitude information subtracted by the preset offset into a first piece of address information based on a preset longitude and latitude mapping table, wherein the preset longitude and latitude mapping table stores the address information, longitude and latitude, and a corresponding relationship between the address information and the longitude and latitude; and
generating the address information of the user based on the first piece of address information and the second piece of address information, wherein the ciphertext is generated based on the longitude and latitude data, the telephone number of the user, and the name of the user; and the operations further comprise:
decrypting the ciphertext to obtain the name of the user.

9. A non-transitory computer readable storage medium, storing a computer program thereon, wherein the program implements, when executed by a processor, a method for information processing, said method for information processing comprising:
acquiring address information and a telephone number of a user;
converting the address information of the user into longitude and latitude data:
encrypting the longitude and latitude data and the telephone number to generate a ciphertext; and
generating a barcode based on the ciphertext, such that a terminal analyzes the address information and the telephone number of the user based on the barcode,
wherein converting the address information of the user into longitude and latitude data comprises:
performing word segmentation on the address information of the user to obtain a keyword set;
using a keyword matching address information of a preset longitude and latitude mapping table in the keyword set to constitute a first piece of address information, and using a keyword unmatching the address information of the preset longitude and latitude mapping table in the keyword set to constitute a second piece of address information, wherein the longitude and latitude mapping table stores the address information, longitude and latitude, and a corresponding relationship between the address information and the longitude and latitude;
converting the first piece of address information into longitude and latitude information based on the longitude and latitude mapping table, and adding a preset offset to longitude data and latitude data in the longitude and latitude information; and
generating the longitude and latitude data based on the longitude and latitude information added with the preset offset and the second piece of address information; and
wherein acquiring address information and a telephone number of a user comprises:
acquiring the address information and the telephone number of the user, and a name of the user; and
the encrypting the longitude and latitude data and the telephone number to generate a ciphertext comprises encrypting the longitude and latitude data, the telephone number, and the name, to generate the ciphertext.

10. A non-transitory computer readable storage medium, storing a computer program thereon, wherein the program implements, when executed by a processor, a method for information processing, said method for information processing comprising:
reading a to-be-identified barcode, and analyzing a ciphertext, the barcode being generated by a server by:
converting address information of a user into longitude and latitude data, encrypting the longitude and latitude data and a telephone number of the user together to generate the ciphertext, and then generating the barcode based on the ciphertext;
decrypting the ciphertext to obtain the longitude and latitude data and the telephone number;
analyzing the address information of the user from the longitude and latitude data; and
decrypting the ciphertext to obtain the name of the user, wherein the analyzing the address information of the user from the longitude and latitude data comprises:
analyzing the longitude and latitude data into longitude and latitude information and a second piece of address information;
subtracting a preset offset from longitude data and latitude data in the longitude and latitude information;
converting the longitude and latitude information subtracted by the preset offset into a first piece of address information based on a preset longitude and latitude mapping table, wherein the longitude and latitude mapping table stores the address information, longitude and latitude, and a corresponding relationship between the address information and the longitude and latitude; and
generating the address information of the user based on the first piece of address information and the second piece of address information; and
wherein the ciphertext is generated based on the longitude and latitude data, the telephone number of the user, and the name of the user.

\* \* \* \* \*